United States Patent [19]
DeWitt et al.

[11] Patent Number: 5,577,224
[45] Date of Patent: Nov. 19, 1996

[54] METHOD AND SYSTEM FOR CACHING DATA

[75] Inventors: Frederick J. DeWitt, Kirkland; Ronald O. Radko, Bellevue, both of Wash.

[73] Assignee: Microsoft Corporation, Redmond, Wash.

[21] Appl. No.: 356,077

[22] Filed: Dec. 13, 1994

[51] Int. Cl.$^6$ .................................................... G06F 12/00
[52] U.S. Cl. .......................... 395/445; 395/485; 395/464
[58] Field of Search ................................. 395/400, 425, 395/600, 440, 464, 421.03, 726, 732, 445, 485; 364/DIG. 1

[56] References Cited

U.S. PATENT DOCUMENTS

| | | | |
|---|---|---|---|
| 5,029,125 | 7/1991 | Sciupac | 395/600 |
| 5,261,072 | 11/1993 | Siegel | 348/405 |
| 5,291,442 | 3/1994 | Emma et al. | 395/425 |
| 5,392,413 | 2/1995 | Nomura et al. | 395/425 |

*Primary Examiner*—Jack B. Harvey
*Assistant Examiner*—Ario Etienne
*Attorney, Agent, or Firm*—Seed and Berry

[57] ABSTRACT

A method and system for caching data that improve the efficiency of a cache are provided. Generally, three types of data are stored in a cache constructed according to the principles of the present invention. These types of data include: (1) path tables, (2) directories, and (3) files. Path tables include data regarding all of the directories on a storage medium, directories include data regarding all of the subdirectories and files in each directory, and files include the actual file data. The preferred embodiment of the cache logically includes eight regions. These regions include (in order of preferred descending priority): (1) path table, (2) directory, (3) two-access, (4) zero-access or prefetch, (5) sequential-locked, (6) one-access, (7) discarded, and (8) invalid. The path table region includes sectors containing path table data, the directory region includes sectors containing directory data, the two-access region includes sectors containing file data that have been accessed twice, the prefetch region includes sectors containing file data that have been prefetched, the sequential-locked region includes sectors containing file data that were prefetched and have now been locked for access, the one-access region includes sectors containing file data that have been accessed once, the discarded region includes empty sectors that are available for reuse, and the invalid region includes a single dummy sector that is used as a placeholder. During operation, a cache manager manages the cache. The cache manager is responsible for manipulating the cache, such as by adding and removing sectors to and from the cache.

6 Claims, 8 Drawing Sheets

METHOD AND SYSTEM FOR CACHING DATA

FIELD OF THE INVENTION

This invention relates generally to caching and, more particularly, to a method and system for caching data from CD-ROM.

BACKGROUND OF THE INVENTION

CD-ROMs are a form of high capacity storage. Data is stored in a single track on a CD-ROM. The track is divided into sectors. Reading data from a CD-ROM requires knowledge of the volume number of the CD-ROM (if there is more than one CD-ROM) and the sector number in which the data is stored on the CD-ROM. For example, a CD-ROM file system typically requests a read by providing a volume number and a sector number to a CD-ROM driver that controls reading the data from the CD-ROM. As with any form of storage medium, reading data from a CD-ROM is time consuming. Thus, it is advantageous to reduce the amount of time spent reading data from a CD-ROM.

One technique for reducing the amount of time spent reading data from a CD-ROM is caching. Through the use of caching, a CD-ROM driver stores in a CD-ROM cache data that has recently been requested from a CD-ROM and data that is expected to be requested next. The CD-ROM cache is typically located in RAM. Then, when a request is received to read data, the CD-ROM driver first determines whether the data is stored in the CD-ROM cache. If the data is stored in the cache (known as a cache hit), the data can be read from the cache in RAM, instead of from the CD-ROM. If the data is not stored in the cache (known as a cache miss), the data must be read from the CD-ROM. Because a read from the cache in RAM is quicker than a read from the CD-ROM, the amount of time spent completing the read is reduced if there is a cache hit. The more often the cache has a hit (as opposed to a miss), the more efficient the cache is. The frequency with which the cache has hits is determined by how good the CD-ROM driver is at predicting which data (i.e., volume number and sector number) will be requested next and, thus, which data to store in the cache.

CD-ROM drivers and other device drivers use various techniques to predict which data will be requested next. For example, one common type of caching technique stores data that has recently been requested. This type of caching technique also stores data that is adjacent to the requested data on the CD-ROM. The adjacent data is stored based on the assumption that once data at a particular location on the CD-ROM has been requested, it is likely that the data adjacent to the requested data will be requested next. This assumption is valid with CD-ROMs because data is typically accessed sequentially or serially (as opposed to randomly) from CD-ROMs. The process of reading the additional adjacent data and storing it in the cache is known as prefetching. The CD-ROM driver reads the data before it has been requested in anticipation that the data will be requested next. As new data is requested and prefetched, the CD-ROM driver replaces the least recently used ("LRU") data in the cache with the new data. This type of caching technique is known as LRU caching. Another common type of caching technique assigns priorities to the various types of data that are stored on the CD-ROM and replaces the various types of data in the cache based on the assigned priorities. This type of caching technique is known as prioritized caching.

While the use of any cache is more efficient than the use of no cache, it is always desirable to increase the number of cache hits and, thus, the efficiency of the cache. As discussed above, the determination of which data to store in the cache controls how efficient the cache is. Thus, a method and system for caching data that improve the efficiency of the cache are desired.

SUMMARY OF THE INVENTION

One aspect of the present invention provides a method and system for caching data that improve the efficiency of a cache. Generally, three types of data are stored in a cache constructed according to the principles of the present invention. These types of data include: (1) path tables, (2) directories, and (3) files. Path tables include data regarding all of the directories on a storage medium (such as the name and location of each directory), directories include data regarding all of the subdirectories and files in each directory (such as the name and location of each subdirectory or file), and files include the actual file data.

The preferred embodiment of the cache logically includes eight regions. These regions include (in order of preferred descending priority): (1) path table, (2) directory, (3) two-access, (4) zero-access or prefetch, (5) sequential-locked, (6) one-access, (7) discarded, and (8) invalid. The path table region includes sectors containing path table data, the directory region includes sectors containing directory data, the two-access region includes sectors containing file data that have been accessed twice, the prefetch region includes sectors containing file data that have been prefetched, the sequential-locked region includes sectors containing file data that were prefetched and have now been locked for access, the one-access region includes sectors containing file data that have been accessed once, the discarded region includes empty sectors that are available for reuse, and the invalid region includes a single dummy sector that is used as a placeholder.

During operation, a cache manager manages the cache. The cache manager is responsible for manipulating the cache, such as by adding and removing sectors to and from the cache. Generally, the process of adding a sector to the cache involves the steps of: (1) balancing the cache, (2) inserting the sector into the cache, and (3) adjusting pointers to the cache. Conversely, the process of removing a sector from the cache involves the steps of: (1) adjusting pointers to the cache and (2) removing the sector from the cache.

DETAILED DESCRIPTION OF THE PREFERRED EMBODIMENT

Figure 1:
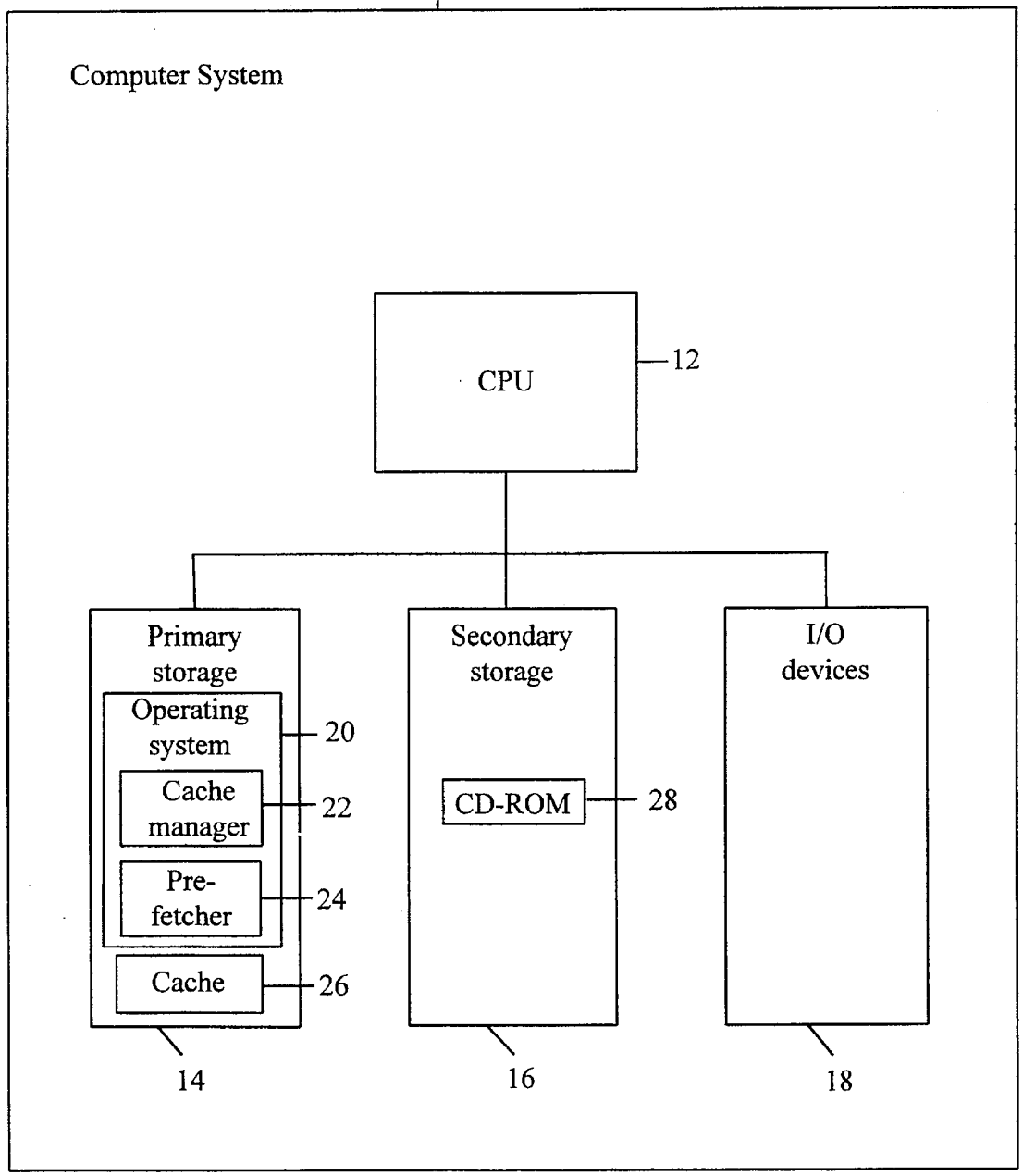
FIG. 1 is a schematic view of a computer system in which the preferred embodiment of the present invention operates.

The preferred embodiment of the present invention provides a method and system for caching data from CD-ROM that improve the efficiency of a cache. A computer system 10 in which the preferred embodiment of the present invention operates is illustrated in FIG. 1. The computer system 10 includes a central processing unit ("CPU") 12, a primary storage 14, a secondary storage 16, and input/output ("I/O") devices 18. An operating system 20 is stored in the primary storage 14 for execution by the CPU 12. The operating system 20 includes a cache manager 22 and a prefetcher 24. The cache manager 22 manages a cache 26 that is stored in the primary storage 14 and the prefetcher 24 prefetches data for the cache 26. The secondary storage 16 includes a CD-ROM 28.

Figure 2:
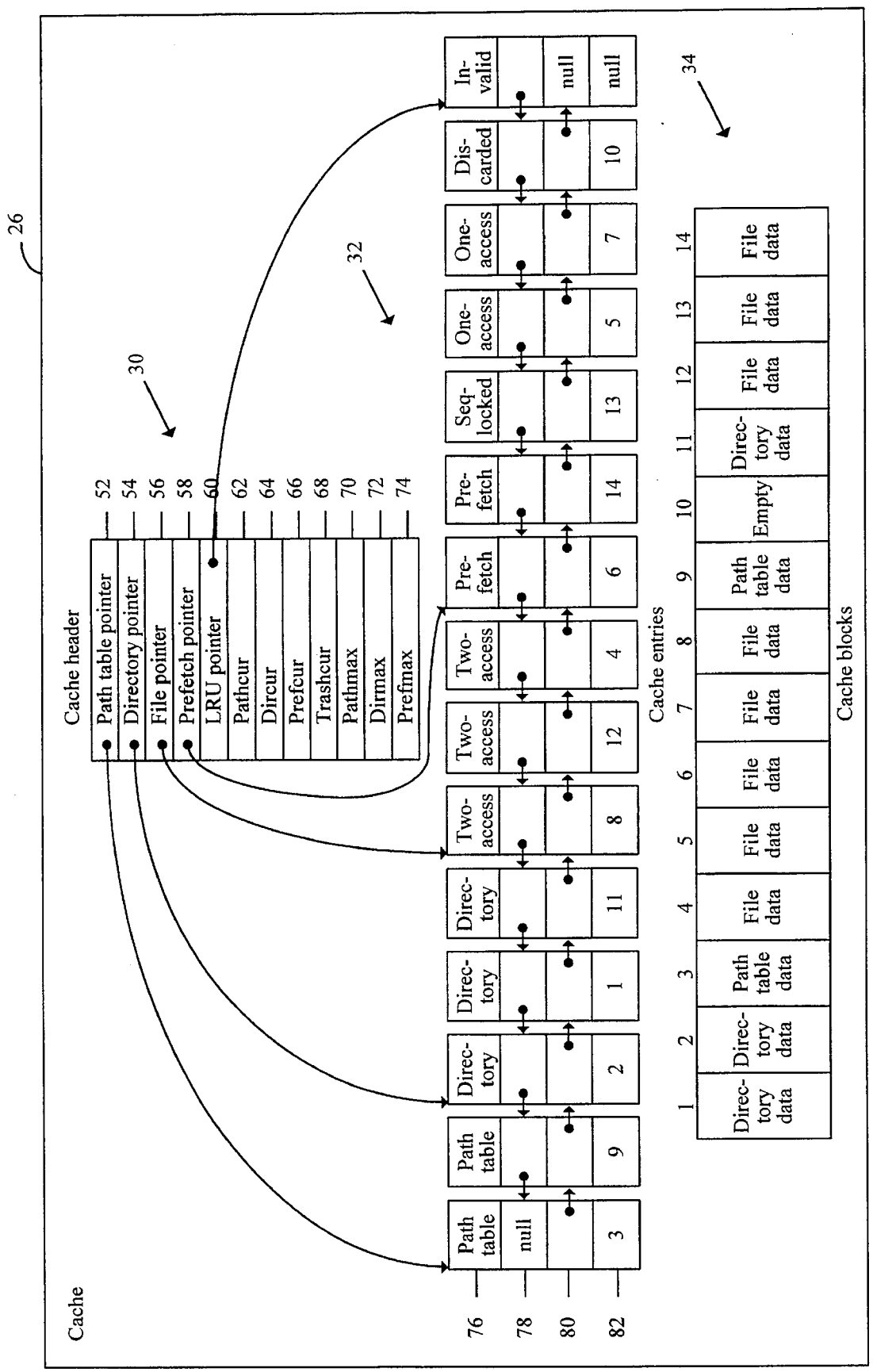
FIG. 2 is a schematic view of the physical structure of a cache constructed according to the principles of the present invention.
Figure 3:
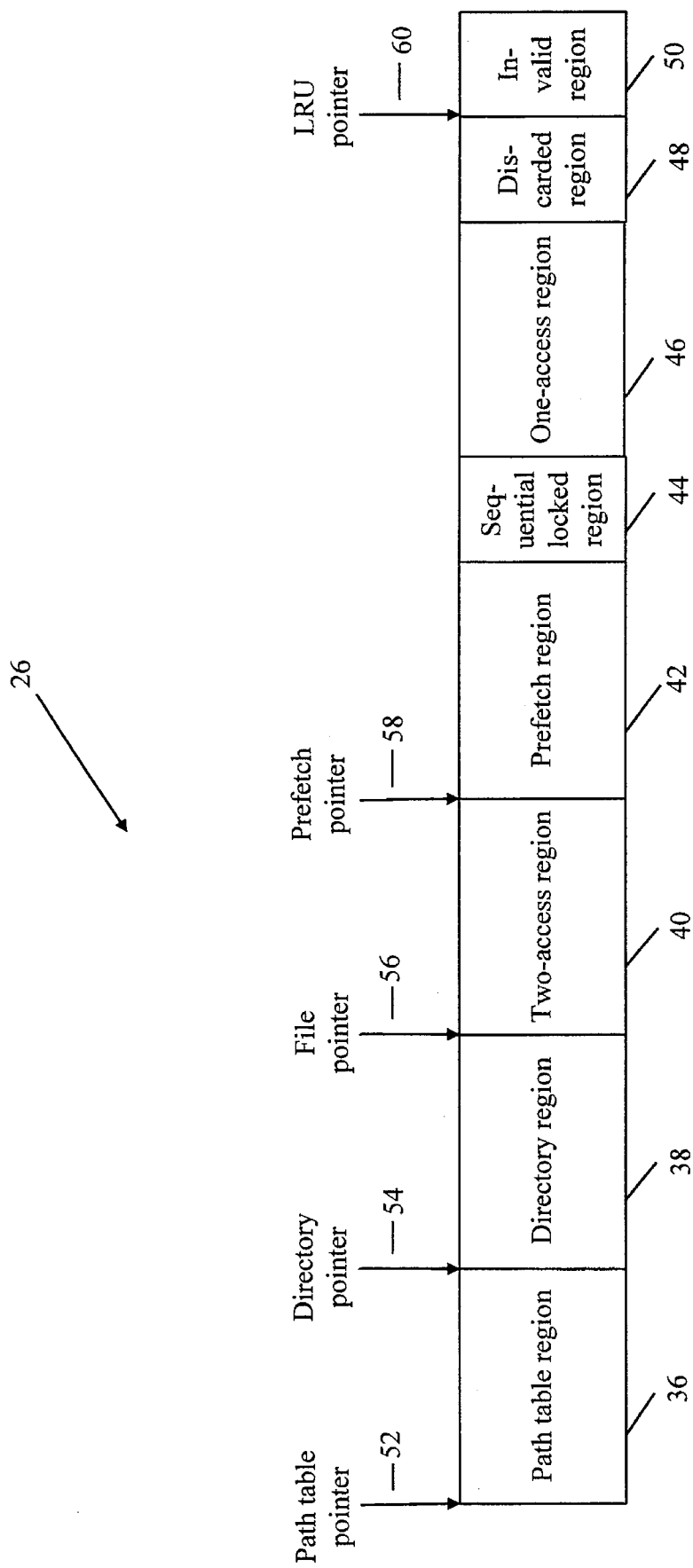
FIG. 3 is a schematic view of the logical structure of the cache of FIG. 2.

A preferred embodiment of the cache 26 is illustrated in FIGS. 2 and 3. FIG. 2 illustrates the actual physical structure of the cache 26, whereas FIG. 3 illustrates the logical structure of the cache. The cache 26 includes a cache header 30, cache entries 32, and cache blocks 34. Each of these components of the cache 26 is described in detail below.

Generally, three types of data are stored in the cache. These types of data include: (1) path tables, (2) directories, and (3) files. Path tables include data regarding all of the directories on a CD-ROM (such as the name and location of each directory), directories include data regarding all of the subdirectories and files in each directory (such as the name and location of each subdirectory or file), and files include the actual file data. Because path tables and directories include data that is important to all files on the CD-ROM, the present invention assigns a higher priority to caching these types of data and a lower priority to caching the data stored in files. Further, the present invention assigns various priorities to the data stored in files depending upon how the data was accessed and how many times the data has been accessed (e.g., was the data read or was it prefetched, has the data been accessed once or twice).

Referring to FIG. 3, the preferred embodiment of the cache 26 logically includes eight regions. These regions include (in order of preferred descending priority):

(1) path table 36, (2) directory 38, (3) two-access 40, (4) zero-access or prefetch 42, (5) sequential-locked 44, (6) one-access 46, (7) discarded 48, and (8) invalid 50.

The path table region 36 includes sectors containing path table data, the directory region 38 includes sectors containing directory data, the two-access region 40 includes sectors containing file data that have been accessed twice, the prefetch region 42 includes sectors containing file data that have been prefetched, the sequential-locked region 44 includes sectors containing file data that were prefetched and have now been locked for access, the one-access region 46 includes sectors containing file data that have been accessed once, the discarded region 48 includes empty sectors that are available for reuse, and the invalid region 50 includes a single dummy sector that is used as a placeholder.

Referring to FIG. 2, the cache header 30 includes information used to manage the cache 26. Specifically, the cache header 30 includes four pointers that point to the most recently used ("MRU") sectors in certain regions of the cache (the "MRU region pointers"). These pointers are used to add sectors to the cache. The MRU region pointers include: (1) a pointer to the path table region (the "path table pointer") 52, (2) a pointer to the directory region (the "directory pointer") 54, (3) a pointer to the two-access region (the "file pointer") 56, and (4) a pointer to the prefetch region (the "prefetch pointer") 58. In addition, the cache header 30 includes a pointer to the invalid region (the "LRU pointer") 60. Further, the cache header 30 includes counters for keeping track of the current number of sectors in certain regions of the cache. These counters include: (1) a counter of the current number of path table sectors ("pathcur") 62, (2) a counter of the current number of directory sectors ("dircur") 64, (3) a counter of the current number of prefetch sectors ("prefcur") 66, and (4) a counter of the current number of one-access and discarded sectors ("trashcur") 68. Additionally, the cache header 30 includes maximum limits on the number of sectors that can be included in certain regions of the cache. These maximum limits include: (1) a maximum limit on the number of path table sectors ("pathmax") 70, (2) a maximum limit on the number of directory sectors ("dirmax") 72, and (3) a maximum limit on the number of prefetch sectors ("prefmax") 74.

Referring further to FIG. 2, the cache entries 32 include information relating to the sectors in the cache 26. In particular, each cache entry 32 includes the priority 76 of the sector (e.g., path table, directory, two-access, prefetch, sequential-locked, one-access, discarded, or invalid). Further, each cache entry 32 includes a pointer to the next more recently used sector in the cache (the "more pointer") 78 and a pointer to the next less recently used sector in the cache (the "less pointer") 80. As a result, the cache entries 32 form a doubly linked list. Additionally, each cache entry 32 includes a reference 82 to the actual cache block 34 in which the sector data is stored. While the preferred embodiment of the present invention utilizes a doubly linked list to store the cache entries, one of ordinary skill in the art will appreciate that other forms of priority queues could be used.

Generally, sectors are added to the cache in the region corresponding to the priority of the sector. The priority is determined based on the contents of the sector and, in certain cases, how the sector was accessed and how many times the sector was accessed. For example, if a sector containing path table data is added to the cache, the sector is stored as the MRU sector in the path table region. If the path table region is full, then the LRU sector in the path table region becomes the MRU sector in the directory region. If the directory region becomes full as a result, then the LRU sector in the directory region becomes the MRU sector in the two-access region, and so on. If a sector containing directory data is then added to the cache, the sector is stored as the MRU sector in the directory region. If the directory region is full, then the lower priority regions are balanced as discussed above. (Actually, the process of adding a sector to the cache involves the steps of balancing the cache and then inserting the sector into the cache, as is described in detail below. Thus, if a sector is added to a region of the cache that is already full, the step of balancing the cache to account for the extra sector in that region will not be performed until the next time a sector is added to the cache. These steps have been described here in reverse order for the purpose of illustration.) Thus, a sector is added to a particular region of the cache based on the priority of the sector. However, the sector moves to lower priority regions of the cache as other sectors are added to the cache. Eventually, if the sector is not accessed, the sector will move through the cache and effectively fall off the end of the cache.

During operation, the cache manager is responsible for managing the cache, such as by adding and removing sectors to and from the cache. Generally, the process of adding a sector to the cache involves the steps of: (1) balancing the cache, (2) inserting the sector into the cache, and (3) adjusting the MRU region pointers to the cache. The cache manager adds a sector to the cache whenever the sector is accessed (i.e., read). Conversely, the process of removing a sector from the cache involves the steps of: (1) adjusting the MRU region pointers to the cache and (2) removing the sector from the cache. The cache manager removes a sector from the cache whenever the sector is accessed and the sector is not a prefetch sector. If a prefetch sector is accessed, the sector remains in the cache, but is locked and moves from the prefetch region to the sequential-locked region. If a non-prefetch sector is accessed, the sector is removed from the cache and then, after the access has been completed, the sector is added to the appropriate region of the cache. For example, if a one-access sector is accessed, after the access has been completed, the sector will be added to the two-access region because the sector has now been accessed twice.

During operation, the prefetcher is responsible for prefetching sectors from the CD-ROM to be added to the cache. Generally, the process of prefetching a sector from the CD-ROM to be added to the cache involves the steps of: (1) reading the sector to be prefetched from the CD-ROM and (2) passing the prefetched sector to the cache manager (so that the cache manager can add the prefetched sector to the prefetch region of the cache). The prefetcher starts prefetching sectors from the CD-ROM whenever an application requests a sector that is not in the cache (i.e., whenever there is a cache miss). In the preferred embodiment of the present invention, the prefetcher asynchronously prefetches sectors. An asynchronous prefetcher prefetches data separately from any application that is reading data, whereas a synchronous prefetcher only prefetches data when it is fulfilling a request to read on behalf of an application that is reading data. In other words, when an application requests a sector that is not in the cache, a synchronous prefetcher fetches the requested sector plus some additional sectors and then returns. An asynchronous prefetcher, on the other hand, starts prefetching sectors when an application requests a sector that is not in the cache and continues to prefetch sectors even after the application has received the requested sector. Thus, an asynchronous prefetcher is able to prefetch or read further ahead of an application than a synchronous prefetcher.

In the preferred embodiment of the present invention, the prefetcher continues to prefetch sectors until the desired number of sectors (as determined by the operating system) have been prefetched. While the prefetcher is prefetching sectors, however, the prefetcher may periodically pause. The prefetcher pauses whenever the current number of one-access and discarded sectors, trashcur, becomes less than or equal to a predefined constant ("preftail"). The prefetcher restarts prefetching sectors whenever trashcur becomes greater than preftail. The size of preftail determines how large the prefetch region is and thus, how often the prefetcher pauses. In general, as preftail increases in size, the prefetch region decreases in size and the prefetcher pauses more often; as preftail decreases in size, the prefetch region increases in size and the prefetcher pauses less often.

Figure 4:
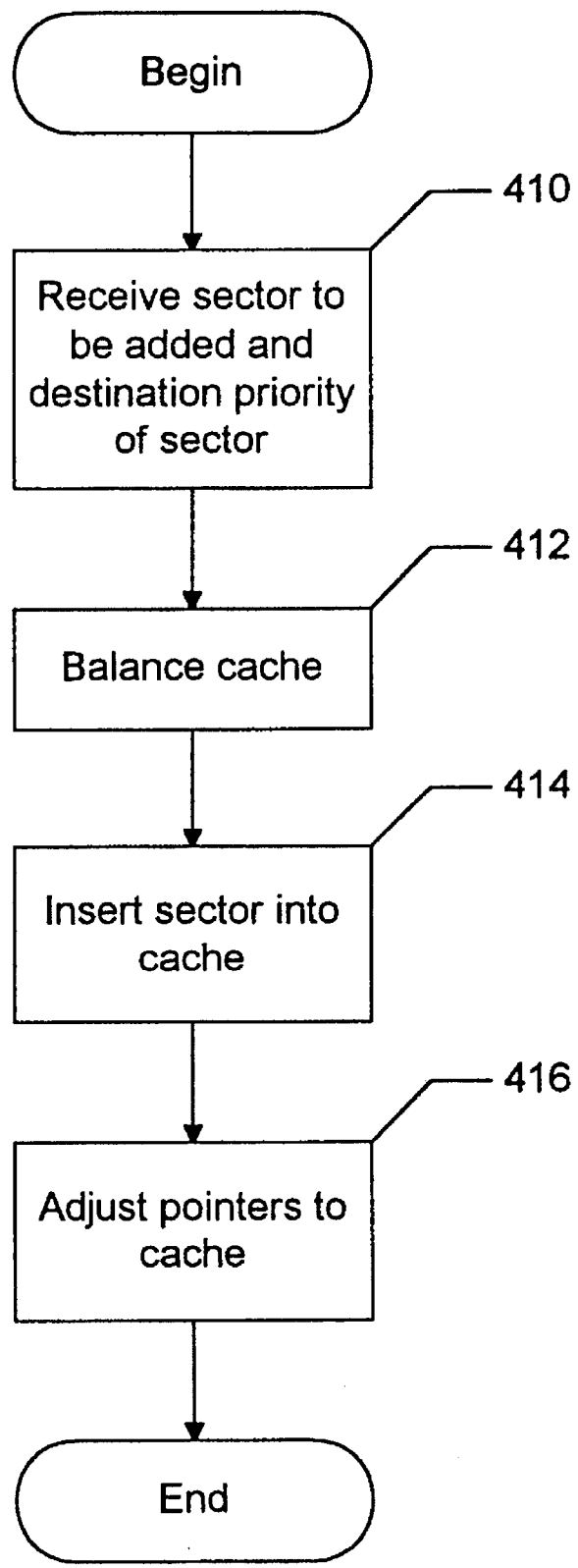
FIG. 4 is a high-level flowchart illustrating the process of adding a sector to the cache of FIGS. 2 and 3.

The process of adding a sector to the cache is illustrated in FIG. 4. In step 410, the cache manager receives the sector to be added and the destination priority of the sector. In step 412, the cache manager balances the cache. Balancing the cache generally involves determining whether any of the regions of the cache need to be reduced or enlarged in size and, if necessary, reducing or enlarging the size of the appropriate regions accordingly. The step of balancing the cache is described in greater detail below in connection with FIG. 5. In step 414, the cache manager inserts the sector into the cache. Inserting the sector into the cache generally involves inserting the sector into the cache on the MRU side of the appropriate region in the cache. The step of inserting the sector into the cache is described in greater detail below in connection with FIG. 6. In step 416, the cache manager adjusts the pointers to the cache. Adjusting the pointers to the cache generally involves determining whether any of the MRU region pointers need to be adjusted and, if necessary, adjusting the appropriate pointers accordingly. The step of adjusting the pointers to the cache is described in greater detail below in connection with FIGS. 7A and 7B.

Figure 5:
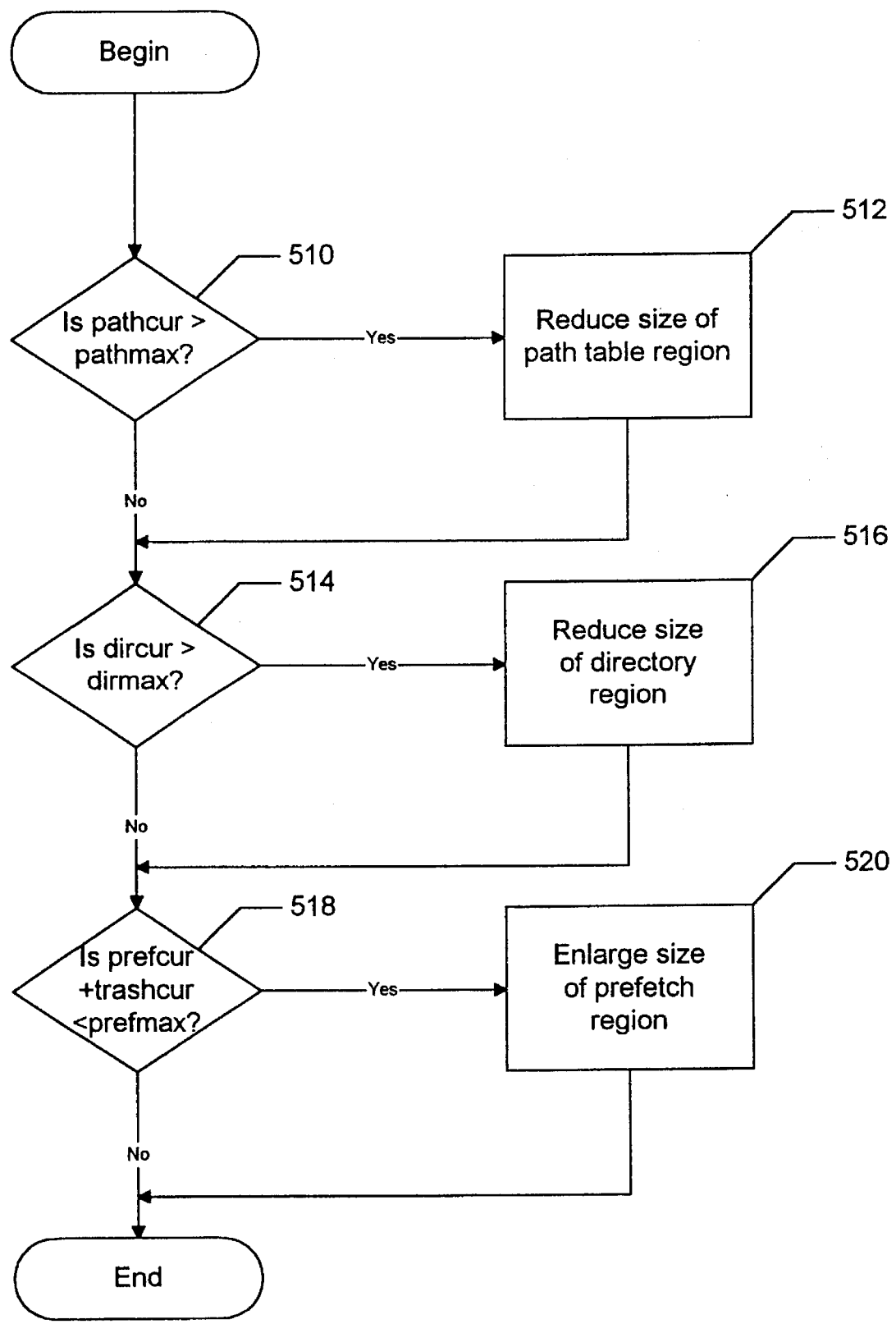
FIG. 5 is a more detailed flowchart illustrating the step of FIG. 4 of balancing the cache.

The step of balancing the cache is illustrated in FIG. 5. Generally, based upon the current number of sectors in various regions of the cache and the maximum number of sectors allowed in those regions of the cache, the cache manager determines whether any of those regions of the cache need to be reduced or enlarged in size and, if necessary, reduces or enlarges the size of the appropriate regions accordingly. For example, if the current number of path table sectors is eight and the maximum number of path table sectors allowed is six, the cache manager reduces the size of the path table region by two sectors. The current number of sectors in a region can be greater than the maximum number of sectors allowed in a region because the cache is always balanced before a sector is added. Thus, the cache manager may balance the cache (ensuring that the current number is not greater than the maximum number) and then add a sector to the cache (causing the current number to exceed the maximum number). The next time a sector is added to the cache, the cache manager will again balance the cache before adding the sector to the cache.

In steps 510–512, the cache manager determines whether the current number of path table sectors is greater than the maximum number of path table sectors allowed and, if necessary, reduces the size of the path table region by the excess number of path table sectors. In step 510, the cache manager determines whether the current number of path table sectors, pathcur, is greater than the maximum number of path table sectors, pathmax. If pathcur is greater than pathmax, the cache manager continues at step 512; otherwise, the cache manager continues at step 514. In step 512, the cache manager reduces the size of the path table region and then continues at step 514. The cache manager reduces the size of the path table region by moving the directory pointer into the path table region by a number of positions equal to the number of excess path table sectors and then changing the priority of the excess sectors from path table to directory.

In steps 514–516, the cache manager determines whether the current number of directory sectors is greater than the maximum number of directory sectors allowed and, if necessary, reduces the size of the directory region by the excess number of directory sectors. In step 514, the cache manager determines whether the current number of directory sectors, dircur, is greater than the maximum number of directory sectors, dirmax. If dircur is greater than dirmax, the cache manager continues at step 516; otherwise, the cache manager continues at step 518. In step 516, the cache manager reduces the size of the directory region and then continues at step 518. The cache manager reduces the size of the directory region by moving the file pointer into the directory region by a number of positions equal to the number of excess directory sectors and then changing the priority of the excess sectors from directory to two-access.

In steps 518–520, the cache manager determines whether the current number of sectors available for prefetch is less than the maximum number of prefetch sectors allowed and, if possible, enlarges the size of the prefetch region by the available number of prefetch sectors. In step 518, the cache manager determines whether the total of the current number of prefetch, one-access, and discarded sectors, prefcur+ trashcur, is less than the maximum number of prefetch sectors, prefmax. If prefcur+trashcur is less than prefmax, the cache manager continues at step 520; otherwise, the cache manager returns. In step 520, the cache manager enlarges the size of the prefetch region (and thus, reduces the size of the two-access region) and then returns. The cache manager enlarges the size of the prefetch region (and reduces the size of the two-access region) by moving the prefetch pointer into the two-access region by a number of positions equal to the number of available prefetch sectors and then changing the priority of the available sectors from file to prefetch.

Figure 6:
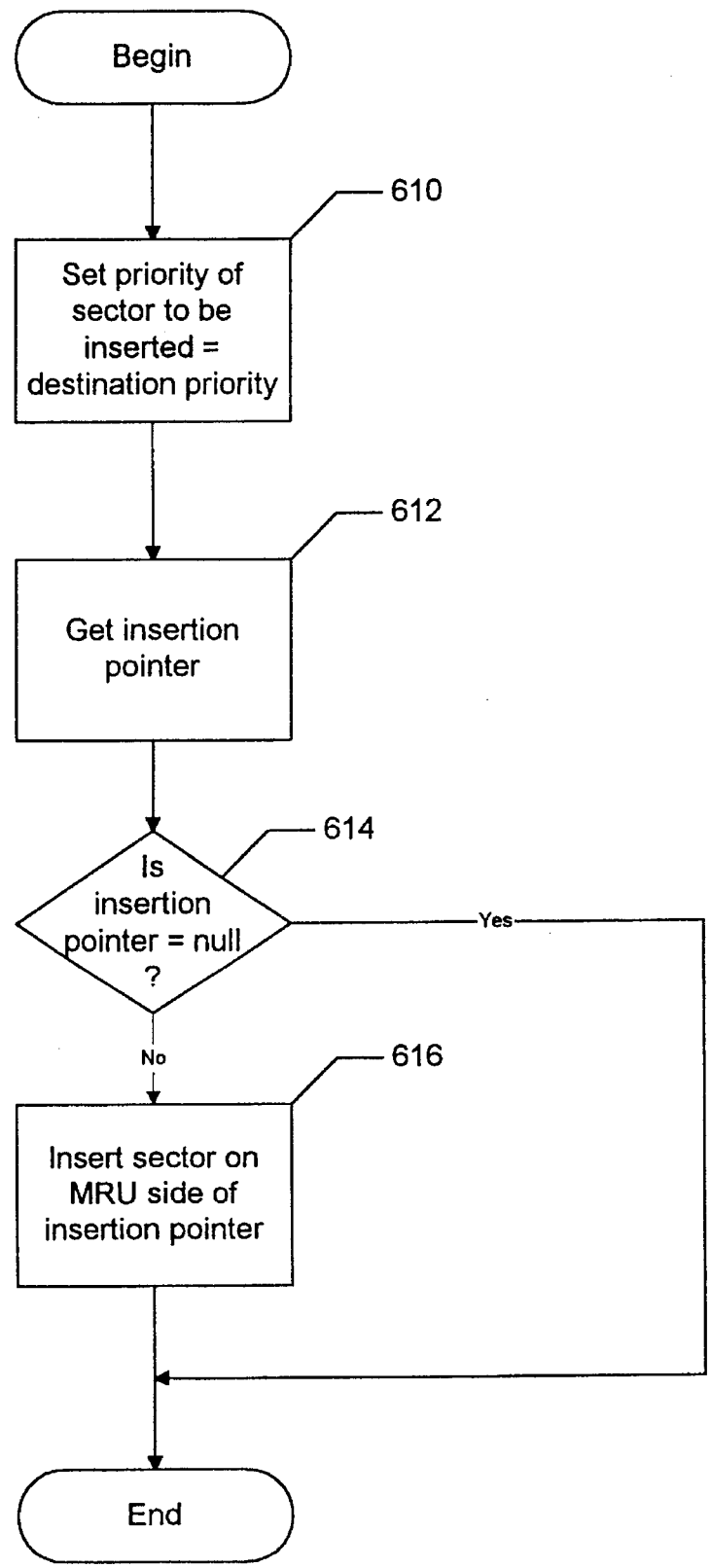
FIG. 6 is a more detailed flowchart illustrating the step of FIG. 4 of inserting a sector into the cache.

The step of inserting the sector into the cache is illustrated in FIG. 6. Generally, based upon the destination priority of the sector to be inserted, the cache manager inserts the sector into the cache on the MRU side of the appropriate region in the cache. In step 610, the cache manager sets the priority of the sector to be inserted equal to the destination priority. In step 612, the cache manager gets a pointer to the appropriate insertion point in the cache (the "insertion pointer"). In step 614, the cache manager determines whether the insertion pointer is equal to null. If the insertion pointer is equal to null, the sector does not need to be inserted into the cache because the sector is already in the cache. For example, the insertion pointer will be equal to null if a sector is moving from prefetch to sequential-locked or from sequential-locked to one-access. If the insertion pointer is equal to null, the cache manager returns; otherwise, the cache manager continues at step 616. In step 616, the cache manager inserts the sector into the cache on the MRU side of the insertion pointer and then returns.

Figure 7A:
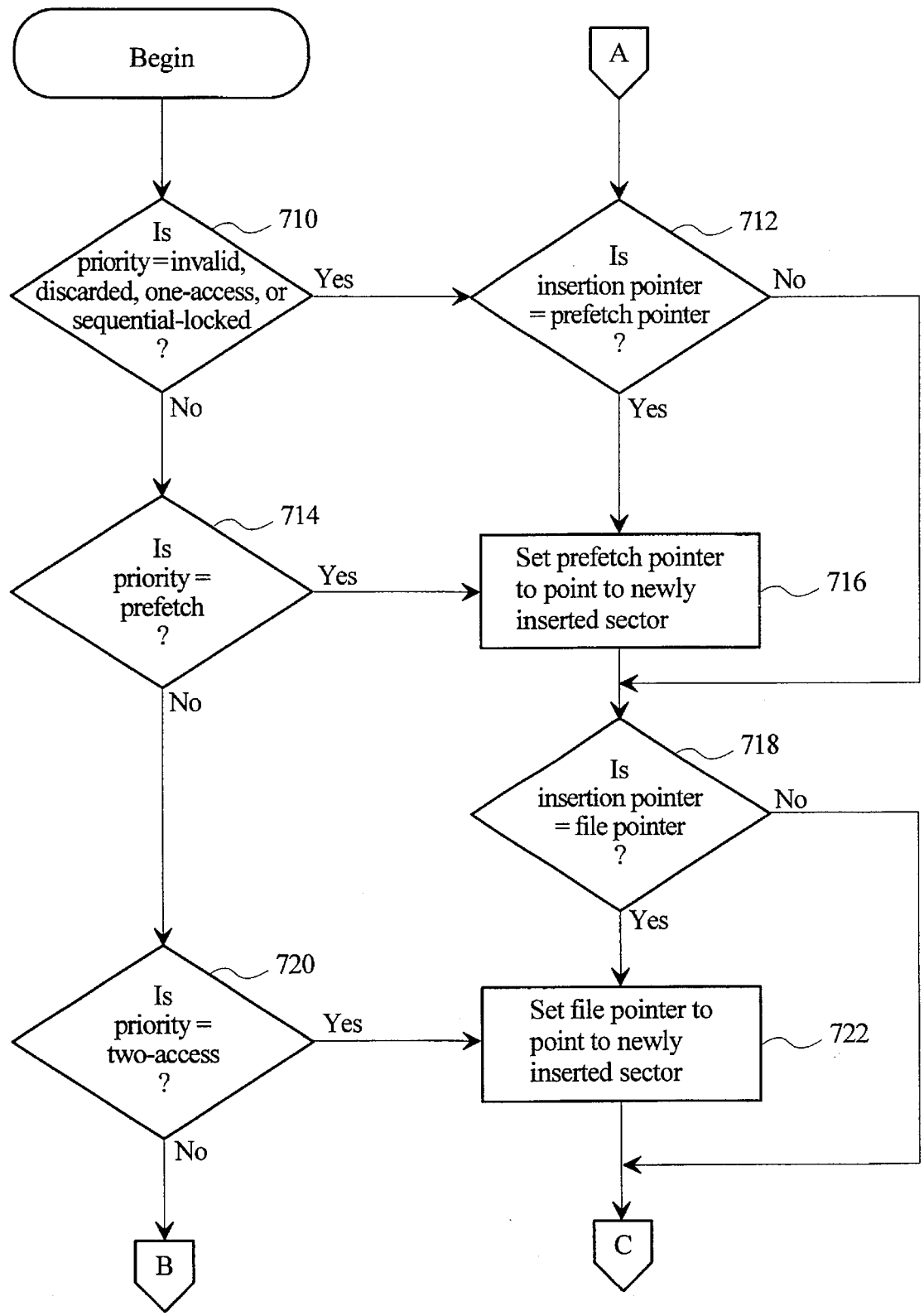
FIGS. 7A and 7B collectively are a more detailed flowchart illustrating the step of FIG. 4 of adjusting pointers to the cache.
Figure 7B:
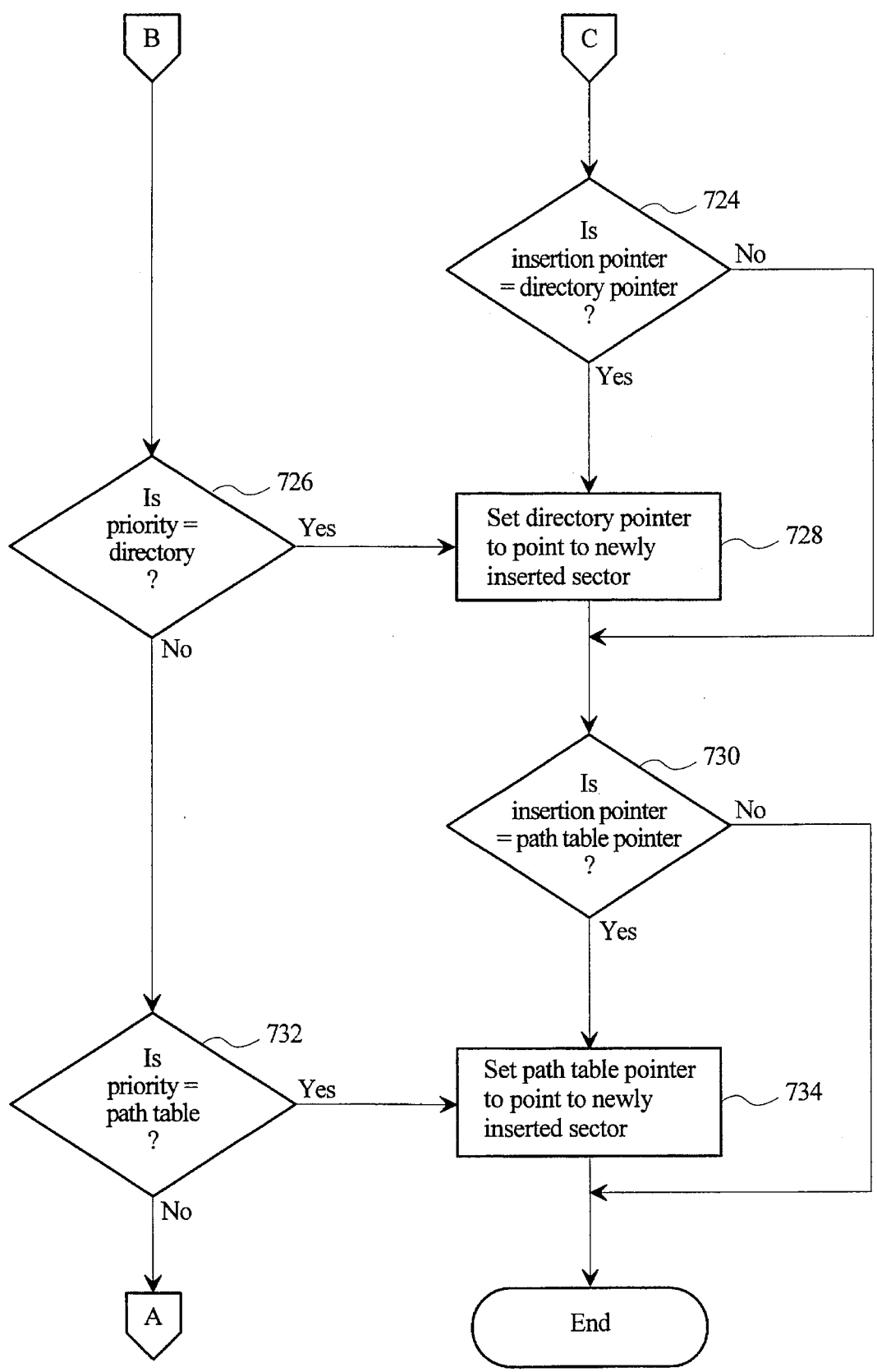

The step of adjusting the pointers to the cache is illustrated in FIGS. 7A and 7B. Generally, based upon where the new sector was inserted into the cache, the cache manager determines whether any of the MRU region pointers need to be adjusted and, if necessary, adjusts the appropriate pointers accordingly. For example, if a sector was inserted into the prefetch region, the prefetch pointer will not be pointing to the MRU sector in the prefetch region (i.e., the newly inserted sector). Rather, the prefetch pointer will be pointing to the next LRU sector in the prefetch region. Thus, the prefetch pointer must be adjusted to point to the newly inserted sector. In step 710, the cache manager determines whether the priority of the newly inserted sector is equal to invalid, discarded, one-access, or sequential-locked. If the priority is equal to one of these four priorities, the cache manager continues at step 712; otherwise, the cache manager continues at step 714.

In steps 712–716, the cache manager determines whether the prefetch pointer needs to be adjusted and, if necessary, adjusts the prefetch pointer. In step 712, the cache manager determines whether the insertion pointer is equal to the prefetch pointer. If the insertion pointer is equal to the prefetch pointer, the cache manager continues at step 716; otherwise, the cache manager continues at step 718. In step 714, the cache manager determines whether the priority is equal to prefetch. If the priority is equal to prefetch, the cache manager continues at step 716; otherwise, the cache manager continues at step 720. In step 716, the cache manager sets the prefetch pointer to point to the newly inserted sector in the cache and then continues at step 718.

In steps 718–722, the cache manager determines whether the file pointer needs to be adjusted and, if necessary, adjusts the file pointer. In step 718, the cache manager determines whether the insertion pointer is equal to the file pointer. If the insertion pointer is equal to the file pointer, the cache manager continues at step 722; otherwise, the cache manager continues at step 724. In step 720, the cache manager determines whether the priority is equal to two-access. If the priority is equal to two-access, the cache manager continues at step 722; otherwise, the cache manager continues at step 726. In step 722, the cache manager sets the file pointer to point to the newly inserted sector in the cache and then continues at step 724.

In steps 724–728, the cache manager determines whether the directory pointer needs to be adjusted and, if necessary, adjusts the directory pointer. In step 724, the cache manager determines whether the insertion pointer is equal to the directory pointer. If the insertion pointer is equal to the directory pointer, the cache manager continues at step 728; otherwise, the cache manager continues at step 730. In step 726, the cache manager determines whether the priority is equal to directory. If the priority is equal to directory, the cache manager continues at step 728; otherwise, the cache manager continues at step 732. In step 728, the cache manager sets the directory pointer to point to the newly inserted sector in the cache and then continues at step 730.

In steps 730–734, the cache manager determines whether the path table pointer needs to be adjusted and, if necessary, adjusts the path table pointer. In step 730, the cache manager determines whether the insertion pointer is equal to the path table pointer. If the insertion pointer is equal to the path table pointer, the cache manager continues at step 734; otherwise, the cache manager returns. In step 732, the cache manager determines whether the priority is equal to path table. If the priority is equal to path table, the cache manager continues at step 734; otherwise, the cache manager continues at step 712. In step 734, the cache manager sets the path table pointer to point to the newly inserted sector in the cache and then returns.

One of ordinary skill in the art will now appreciate that the present invention provides a method and system for caching data that improve the efficiency of a cache. Although the present invention has been shown and described with reference to a preferred embodiment, equivalent alterations and modifications will occur to those skilled in the art upon reading and understanding this specification. For example, while the preferred embodiment of the present invention provides a method and system for caching data from CD-ROM, one of ordinary skill in the art will appreciate that the principles of the present invention may be applied to caching data from other forms of storage media (such as floppy disks, hard disks, and tapes), in particular, forms of storage media from which data is accessed sequentially or serially. The present invention includes all such equivalent alterations and modifications and is limited only by the scope of the following claims.

What is claimed is:

1. A method in a computer system for caching data from CD-ROM, comprising the computer-implemented steps of:

receiving a sector to be cached;

when the sector is a path table sector, caching the sector at the highest priority;

when the sector is a directory sector, caching the sector at the second highest priority;

when the sector is a file sector that has been accessed twice, caching the sector at the third highest priority;

when the sector is a file sector that has been prefetched, caching the sector at the fourth highest priority;

when the sector is a file sector that was prefetched and has been locked for access, caching the sector at the fifth highest priority;

when the sector is a file sector that has been accessed once, caching the sector at the sixth highest priority; and when the sector is a discarded sector, caching the sector at the seventh highest priority.

2. A method in a computer system for determining priority of data in a cache memory, the data being of a type that is path table data, directory data, or file data, comprising:

receiving data to store in the cache memory;

determining the type of the received data;

when the type of the data is path table data, storing the data in the cache memory with a priority that is a high priority;

when the type of the data is directory data, storing the data in the cache memory with a priority that is a medium priority;

when the type of the data is file data, storing the data in the cache memory with a priority that is a low priority; and when receiving additional data to store in the cache memory, lowering the priority of the data currently in cache memory that has a priority that is less than or equal the priority of the new data wherein data in cache memory with a lowest priority is allocated for storing newly received data.

3. The method of claim 2 wherein the file data further includes file data that has been accessed twice while in cache memory, file data that has been pre-fetched, and file data that has been accessed only once while in cache memory, and wherein when storing the file data in cache memory, file data that has been accessed twice receives a higher priority than file data that has been pre-fetched and pre-fetched file data receives a higher priority than file data that has been accessed only once.

4. A cache management system for determining priority of data in a cache memory, the data being of a type that is path table data, directory data, or file data, comprising:

means for receiving data to store in the cache memory;

means for determining the type of the received data;

means for storing the data in the cache memory with a priority that is a high priority when the type of the data is path table data;

means for storing the data in the cache memory with a priority that is a medium priority when the type of the data is directory data; and means for storing the data in the cache memory with a priority that is a low priority when the type of the data is file data; and means for lowering the priority of the data currently in cache memory that has a priority that is less than or equal the priority of the new data when receiving additional data to store in the cache memory.

5. In a computer-readable storage device containing instructions for causing a computer system to determine priority of data in a cache memory, the data being of a type that is path table data, directory data, or file data, the method comprising:

receiving data to store in the cache memory;

determining the type of the received data;

when the type of the data is path table data, storing the data in the cache memory with a priority that is a high priority;

when the type of the data is directory data, storing the data in the cache memory with a priority that is a medium priority;

when the type of the data is file data, storing the data in the cache memory with a priority that is a low priority; and when receiving additional data to store in the cache memory, lowering the priority of the data currently in cache memory that has a priority that is less than or equal the priority of the new data wherein data in cache memory with a lowest priority is allocated for storing newly received data.

6. The computer-readable storage device of claim 5 wherein the file data further includes file data that has been accessed twice while in cache memory, file data that has been pre-fetched, and file data that has been accessed only once while in cache memory, and whereto when storing the file data in cache memory, file data that has been accessed twice receives a higher priority than file data that has been pre-fetched and pre-fetched file data receives a higher priority than file data that has been accessed only once.

\* \* \* \* \*

UNITED STATES PATENT AND TRADEMARK OFFICE
CERTIFICATE OF CORRECTION

PATENT NO. : 5,577,224
DATED : November 19, 1996
INVENTOR(S) : Frederick J. DeWitt et al.

It is certified that error appears in the above-indentified patent and that said Letters Patent is hereby corrected as shown below:

In column 9, claim 2, line 16, following the third instance of "data," and preceding "comprising:" please insert --the method--.

In column 10, claim 6, line 43, please delete "whereto" and insert therefor --wherein--.

Signed and Sealed this

Thirteenth Day of May, 1997

Attest:

BRUCE LEHMAN

Attesting Officer

Commissioner of Patents and Trademarks